(12) United States Patent
Inanc et al.

(10) Patent No.: US 9,329,303 B2
(45) Date of Patent: May 3, 2016

(54) SINGLE DETECTOR DETECTION AND CHARACTERIZATION OF THERMAL AND EPITHERMAL NEUTRONS FROM AN EARTH FORMATION

(71) Applicants: Feyzi Inanc, Spring, TX (US); Robbie L. Allen, The Woodlands, TX (US); Nikolay N. Velker, Novosibirsk (RU)

(72) Inventors: Feyzi Inanc, Spring, TX (US); Robbie L. Allen, The Woodlands, TX (US); Nikolay N. Velker, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 194 days.

(21) Appl. No.: 13/645,212

(22) Filed: Oct. 4, 2012

(65) Prior Publication Data
US 2014/0097335 A1    Apr. 10, 2014

(51) Int. Cl.
*G01V 5/04*    (2006.01)
*G01V 5/10*    (2006.01)

(52) U.S. Cl.
CPC ..................... *G01V 5/107* (2013.01)

(58) Field of Classification Search
CPC ............ G06T 3/06; G06T 3/00; G01V 5/107; G01N 23/09
USPC ........................................................ 250/265
See application file for complete search history.

(56) References Cited

U.S. PATENT DOCUMENTS

| | | | |
|---|---|---|---|
| 3,288,996 A | | 11/1966 | Monaghan |
| 3,426,195 A | | 2/1969 | Julious et al. |
| 3,786,253 A | * | 1/1974 | Haffner et al. ............ 250/360.1 |
| 4,556,793 A | | 12/1985 | Allen et al. |
| H000590 H | * | 2/1989 | Chiles et al. .................. 250/367 |

(Continued)

OTHER PUBLICATIONS

ISR and Written Opinion in PCT/US2013/068006, dated Feb. 7, 2014.

(Continued)

*Primary Examiner* — Kiho Kim
(74) *Attorney, Agent, or Firm* — Mossman Kumar & Tyler PC

(57) ABSTRACT

An apparatus for detecting thermal and epithermal neutrons. The apparatus includes a first radiation responsive element configured to absorb substantially all incident thermal neutrons and produce first light scintillations indicative of the absorbed thermal neutrons and a second radiation responsive element configured to produce second light scintillations indicative of at least epithermal neutrons that traverse the first radiation responsive element. Also disclosed are borehole logging methods and apparatuses for estimating formation properties using nuclear radiation, particularly an apparatus and method for estimating parameters of a formation. The method may include using neutron count rate information from a detector to model porosity or salinity. The apparatus includes a processor and storage subsystem with a program that, when executed, implements the method.

11 Claims, 7 Drawing Sheets

(56) References Cited

U.S. PATENT DOCUMENTS

| | | | |
|---|---|---|---|
| 5,061,849 A * | 10/1991 | Meisner et al. | 250/254 |
| 5,083,124 A | 1/1992 | Nordstrom | |
| 5,126,564 A | 6/1992 | Perry et al. | |
| 5,734,166 A * | 3/1998 | Czirr | 250/390.11 |
| 5,789,752 A | 8/1998 | Mickael | |
| 7,308,074 B2 * | 12/2007 | Jiang et al. | 378/19 |
| 7,857,993 B2 | 12/2010 | Dai et al. | |
| 2002/0153481 A1 * | 10/2002 | Stoller et al. | 250/266 |
| 2004/0178337 A1 | 9/2004 | Kurkoski et al. | |
| 2009/0129538 A1 * | 5/2009 | Tkaczyk et al. | 378/5 |
| 2009/0140134 A1 | 6/2009 | Stoller et al. | |
| 2011/0313669 A1 | 12/2011 | Thornton | |
| 2012/0126106 A1 | 5/2012 | Zhou et al. | |
| 2012/0197529 A1 | 8/2012 | Stephenson et al. | |
| 2012/0312994 A1 | 12/2012 | Nikitin et al. | |

OTHER PUBLICATIONS

S. Locke et al., "Theory, Response and Calibration of an MWD Neutron Porosity Sensor Employing Sidewall-Mounted L16 Glass Scientillation Neutron Detectors and Spectral Processing," SPWLA 32, Annual Logging Symposium (1991).

Anton Nikitin, et al., "An Impact of Nanotechnology on the Next Generation of Neutron Porosity LWD Tools," SPE Int'l Oilfield Nanotechnology Conference, Noordwijk, The Netherlands (Jun. 12-14, 2012).

* cited by examiner

SINGLE DETECTOR DETECTION AND CHARACTERIZATION OF THERMAL AND EPITHERMAL NEUTRONS FROM AN EARTH FORMATION

FIELD OF THE DISCLOSURE

In one aspect, this disclosure generally relates to borehole logging methods and apparatuses for estimating formation properties using nuclear radiation based measurements.

BACKGROUND OF THE DISCLOSURE

Oil well logging has been known for many years and provides an oil and gas well driller with information about the particular earth formation being drilled. In conventional oil well logging, during well drilling and/or after a well has been drilled, a radiation source and associated radiation detectors may be conveyed into the borehole and used to determine one or more parameters of interest of the formation. A rigid or non-rigid carrier is often used to convey the radiation source, often as part of a tool or set of tools, and the carrier may also provide communication channels for sending information up to the surface. The present disclosure is directed to enhancing the manufacture, use, and effectiveness of such devices.

SUMMARY OF THE DISCLOSURE

In aspects, the present disclosure is related to methods of estimating a parameter of interest of a formation using radiation detected from a subterranean formation.

One embodiment according to the present disclosure may be an apparatus for detecting neutrons comprising a first radiation responsive element configured to absorb substantially all incident thermal neutrons and produce first light scintillations indicative of the absorbed thermal neutrons and a second radiation responsive element configured to produce second light scintillations indicative of at least epithermal neutrons that traverse the first radiation responsive element.

Another embodiment according to the present disclosure may be a method for estimating a parameter of an earth formation, comprising: estimating the porosity using a model relating incident neutron information from a first radiation responsive element of a detector to incident neutron information from a second radiation responsive element of a detector. The detector may comprise a first radiation responsive element configured to absorb substantially all incident thermal neutrons and produce first light scintillations indicative of the absorbed thermal neutrons and a second radiation responsive element configured to produce second light scintillations indicative of at least absorbed epithermal neutrons that traverse the first radiation responsive element.

Another embodiment according to the present disclosure may be a method for estimating porosity and/or salinity using a model relating incident neutron information from a first radiation responsive element of a detector to incident neutron information from a second radiation responsive element of a detector.

Another embodiment according to the present disclosure may be a method of evaluating an earth formation intersected by a borehole, the method comprising: absorbing, in a first radiation responsive element of an integrated detector, substantially all incident thermal neutrons and thereby producing first light scintillations indicative of the absorbed thermal neutrons; and producing, in a second radiation responsive element of the integrated detector, light scintillations indicative of at least epithermal neutrons that traverse a first radiation responsive element of an integrated detector.

Another embodiment according to the present disclosure may be an apparatus for estimating a parameter of an earth formation, comprising: a processor; a subsystem non-transitory computer-readable medium; and a program stored by the non-transitory computer-readable medium comprising instructions that, when executed, cause the processor to: estimate a parameter of interest, such as, for example, porosity and/or salinity, using a model relating incident neutron information from a first radiation responsive element of a detector to incident neutron information from a second radiation responsive element of a detector.

Examples of features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

In aspects, this disclosure relates to detecting thermal and epithermal neutrons returning from a subterranean formation. In other aspects, this disclosure relates to estimating a parameter of interest, such as, for example, porosity of a subterranean formation, from detected neutrons. Illustrative methods for estimating porosity may include the acquiring and utilization of information characterizing neutrons detected at a single detector as thermal or epithermal neutrons. In many instances, the information used for these estimations may be acquired by tools deployed into a wellbore intersecting one or more formations of interest. For context, an exemplary system for deploying and using such tools to acquire this information is described below. Each of these aspects may be referred to generally as investigation of the formation.

The formation may be exposed to energy from a radiation source. Downhole tools may include this radiation source and one or more detectors. Herein, the radiation source may include, but is not limited to, one or more of a neutron source, a gamma-ray source, and an x-ray source. The detectors may be used to detect radiation from the formation, though the detectors are not limited to detecting radiation of the same type as emitted by the radiation source. Detectors may have shielding to prevent the counting of radiation from unintended sources.

General embodiments in accordance with the invention may include an apparatus for detecting thermal and epithermal neutrons. The apparatus includes a first radiation responsive element configured to absorb substantially all incident thermal neutrons and produce first light scintillations indicative of the absorbed thermal neutrons and a second radiation responsive element configured to produce second light scintillations indicative of at least epithermal neutrons that traverse the first radiation responsive element. Also disclosed are borehole investigation methods and apparatuses for estimating formation properties using nuclear radiation, particularly an apparatus and method for estimating parameters of a formation. The method may include using neutron count rate information from a detector to model porosity, shale content, or salinity, or other parameters of interest. The apparatus includes a processor and storage subsystem with a program that, when executed, implements the method.

Figure 1:
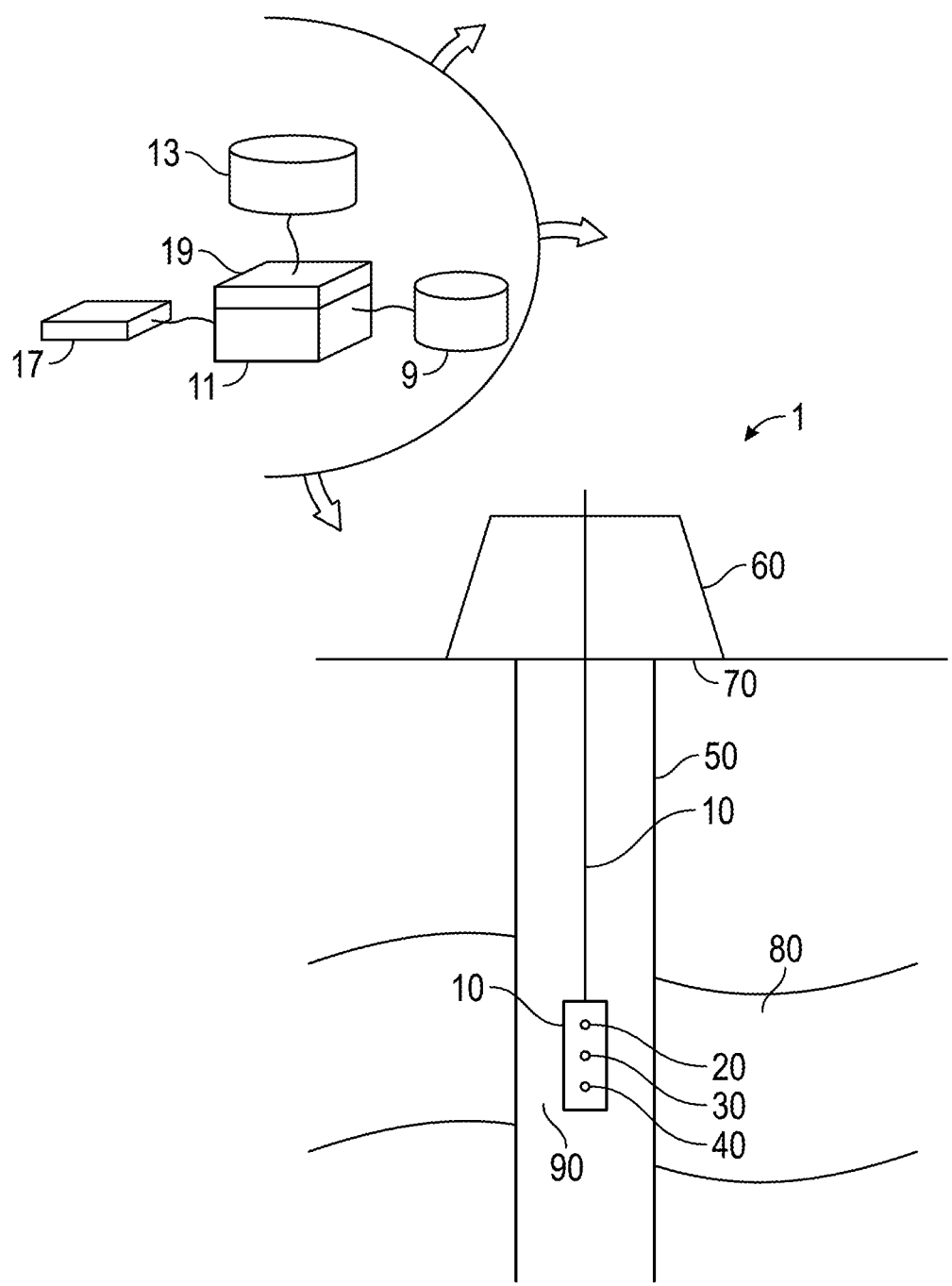
FIG. 1 shows a schematic of a downhole tool deployed in a wellbore in accordance with embodiments of the present disclosure.

FIG. 1 schematically illustrates a drilling system 1 having a downhole tool 10 configured to acquire information for estimating porosity or another parameter of interest of a formation 80. In one illustrative embodiment, the tool 10 may contain a radiation source 40 and associated sensors for detection, or detectors 20, 30. Sensors 20 may detect one or more parameters of a formation. Parameters of a formation may include information relating to a geological parameter, a geophysical parameter, a petrophysical parameter, and/or a lithological parameter. Thus, the sensors 20 may include sensors for estimating formation resistivity, dielectric constant, the presence or absence of hydrocarbons, acoustic porosity, bed boundary, formation density, nuclear porosity and certain rock characteristics, permeability, capillary pressure, and relative permeability.

The system 1 may include a conventional derrick 60 erected on a derrick floor 70. A conveyance device (carrier 15) which may be rigid or non-rigid, may be configured to convey the downhole tool 100 into wellbore 50 in proximity to formation 80. The carrier 15 may be a drill string, coiled tubing, a slickline, an e-line, a wireline, etc. Downhole tool 10 may be coupled or combined with additional tools (e.g., some or all the information processing system of FIG. 10). Thus, depending on the configuration, the tool 10 may be used during drilling and/or after the wellbore 50 has been formed. While a land system is shown, the teachings of the present disclosure may also be utilized in offshore or subsea applications. The carrier 15 may include embedded conductors for power and/or data for providing signal and/or power communication between the surface and downhole equipment. The carrier 15 may include a bottom hole assembly, which may include a drilling motor for rotating a drill bit.

The radiation source 40 emits radiation (e.g., neutrons) into the formation to be surveyed. In one embodiment, the downhole tool 10 may use a pulsed neutron generator emitting 14.2 MeV fast neutrons as its radiation source 40. The use of 14.2 MeV neutrons from a pulsed neutron source is illustrative and exemplary only, as different energy levels of neutrons may be used. In some embodiments, the radiation source 40 may be continuous. In some embodiments, the radiation source 40 may be controllable in that the radiation source may be turned "on" and "off" while in the wellbore, as opposed to a radiation source that is "on" continuously. The measurements performed using this type of radiation may be referred to as "sourceless" measurements since they employ a source that may be turned off, as opposed to a continuously emitting chemical radiation source.

The detectors 20, 30 provide signals that may be used to estimate the radiation counts (e.g., neutron counts) returning from the formation. Generally, detectors 20, 30 are spaced in a substantially linear fashion relative to the radiation source. If two detectors are used, there may be a short spaced (SS) detector and a long spaced (LS) detector, wherein the detectors have different distances from the radiation source. For instance, in one embodiment, detector 30 may be a short spaced detector, and detector 20 may be a long spaced detector. The SS and LS detectors are not limited to being placed on the same side of the radiation source and their spacing from the radiation source may be equal or unequal. Additional detectors may be used to provide additional radiation information. Two or more of the detectors may be neutron detectors. Some embodiments may include radiation shielding (not shown), which may be located between radiation source 40 and the detectors 20, 30. Radiation shielding may include, but is not limited to, gamma-ray shielding and neutron shielding. Drilling fluid 90 may be present between the formation 80 and the downhole tool 10, such that emissions from radiation source 40 may pass through drilling fluid 90 to reach formation 80 and radiation induced in the formation 80 may pass through drilling fluid 90 to reach the detectors 20, 30.

In one embodiment, electronics (not shown) associated with the detectors may be configured to record radiation counts from at least two axially spaced detectors 20, 30 and generate a time-dependent ratio between axially spaced detectors by using information from multiple bursts. This detection may occur within very narrow time bins or windows (on the order of 1 to 1000 microseconds). This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as may occur with a continuous radiation source. In some embodiments, the time-dependent ratio may be weighted. The axially spaced detector count rate ratios may be obtained as a function of time and graphically illustrated as a time-dependent ratio curve. Various properties of the formation may be determined using the time-dependent ratio curve, including, but not limited to, porosities of the formation.

In other embodiments, such electronics may be located elsewhere (e.g., at the surface). To perform the treatments during a single trip, the tool may use a "high bandwidth" transmission to transmit the information acquired by detectors 20, 30 to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

One or more of the neutron detectors may include a scintillator component comprising a plurality of radiation responsive elements which produce light scintillations in response to absorbing neutrons, and at least one light responsive device (e.g., a photomultiplier tube, other photomultiplier device, charge coupled silicon device, and so on) configured to produce an output representative of the respective light scintillations. The scintillator component may be configured so a first radiation responsive element is positioned in the available paths for neutrons that would otherwise be incident on the second radiation responsive element. Thus no neutrons may reach the second element without traversing the first element. "Radiation responsive" is defined as the characteristic of producing a detectable emission in response to absorbing radiation such that the absorbed radiation is quantifiable according to the emissions. One class of radiation responsive materials, these emissions are photons produced by scintillation. In scintillation, light is emitted as a result of the absorption of radiation, such as, for example, a neutron. Radiation responsive elements may include glass doped with isotopes of one or more of lithium (e.g., Li-6, Li-7), cerium, europium, praseodymium, and terbium. The isotope may be used as an activator in activation doping (e.g., cerium activation doping) or the like.

Figure 3A:
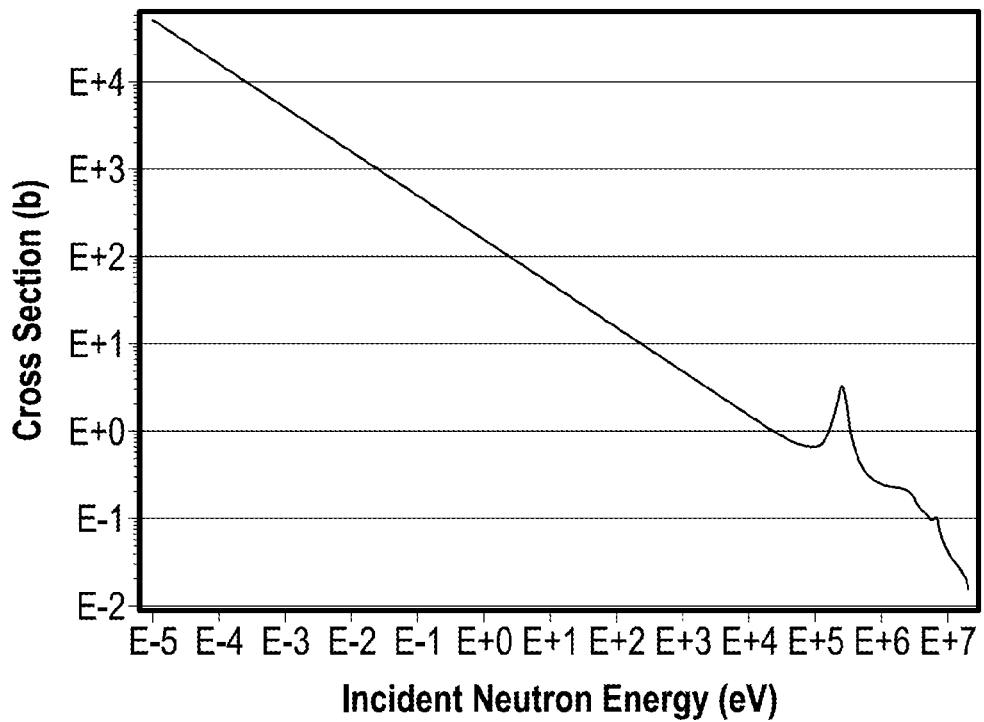
FIG. 3A shows a graphical illustration of the relationship between (n,t) reaction cross sections and incident neutron energy.
Figure 3B:
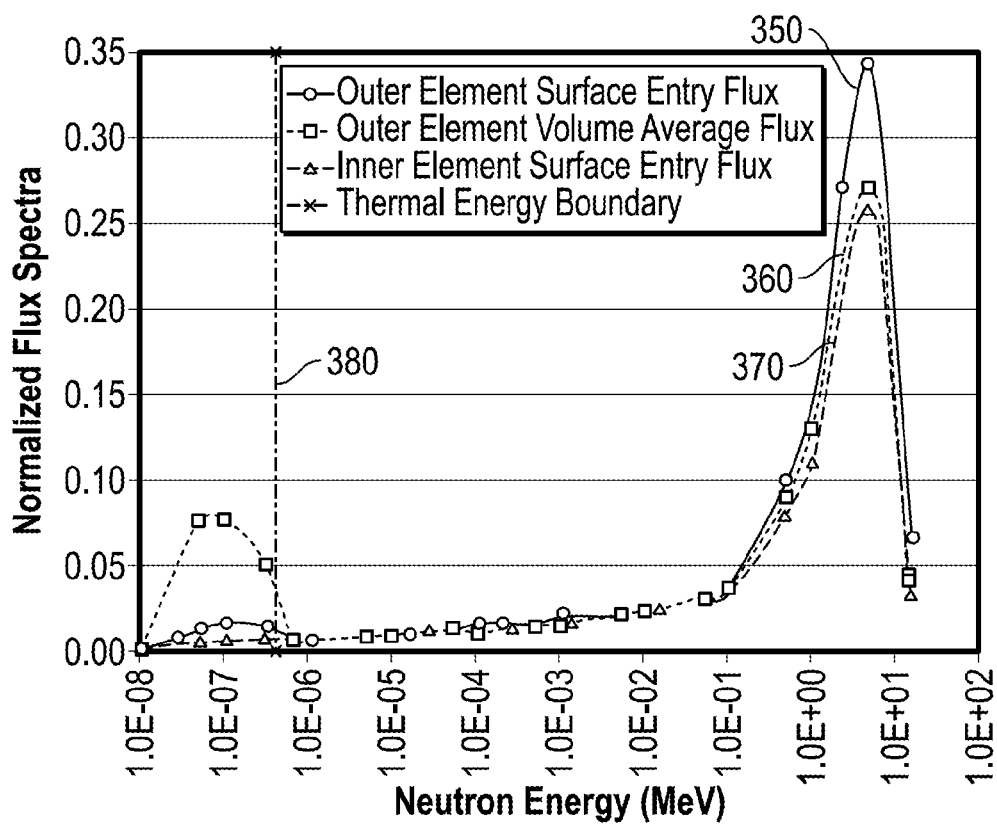
FIG. 3B shows a graphical illustration of the neutron flux spectra for individual radiation responsive elements.

A first radiation responsive element is adapted to capture thermal neutrons with high efficiency. For example, the first element may be configured to absorb or otherwise capture substantially all the thermal neutrons incident on the first element, such that any thermal neutrons traversing the first element do not spoil the epithermal count, with the absorption producing first light scintillations indicative of the absorbed thermal neutrons, while letting substantially all epithermal neutrons pass through, such that any captured epithermal neutrons do not spoil the thermal neutron count, as illustrated in FIG. 3B and described below in further detail. Referring to FIG. 3B, the flux of the first element (outer element surface entry flux 350, outer element volume average flux 360) indicates significant thermal neutrons, while the flux of the second element (inner element surface entry flux 370) indicates that almost no thermal neutrons remain. Almost all neutrons remaining have energies higher than the thermal neutron threshold (indicated by the thermal neutron boundary 380).

In one embodiment, the first element may have a high thermal neutron absorption cross section (e.g., more than 900 barns), while having a thickness selected to be greater than the mean free path of thermal neutrons and less than the mean free path of epithermal neutrons, so as to absorb substantially all thermal neutrons while allowing epithermal neutrons to traverse the first element. One or more remaining radiation responsive elements (second radiation responsive element) may be configured to absorb or otherwise capture epithermal neutrons, such as, for example, the epithermal neutrons incident on the second element. The captured portion of epithermal neutrons may be substantially the same as a count of conventionally detectable epithermal neutrons incident on the second radiation responsive element over the period of time (a portion similar to the portion detectable on currently implemented separately mounted single-purpose epithermal detectors of the art), or a statistically significant portion of the neutrons, a meaningful portion of the neutrons, and so on. The second radiation responsive element may be configured to produce second light scintillations indicative of at least epithermal neutrons that transverse the first radiation responsive element. Thus, a count of the first light scintillations over a period of time following exposure of the earth formation to energy from a radiation source is substantially the same as a count of the thermal neutrons incident on the first radiation responsive element over the period of time. Similarly, a count of the second light scintillations over the period of time is substantially the same as a count of conventionally detectable epithermal neutrons incident on the second radiation responsive element over the period of time.

By "substantially all," it is meant a portion of thermal neutrons sufficiently high to allow use of thermal and epithermal counts from the detector and derivations and comparisons thereof (differences, ratios, rates of change, and so on) to determine a parameter of interest of the borehole, as currently implemented in separate thermal and epithermal sensor systems of the art, examples of such a portion including, for example, at least 50 percent, at least 90 percent, at least 95 percent, at least 99 percent, at least 99.9 percent, and so on, up to an including all incident thermal neutrons.

The radiation responsive elements may be mounted at the same axial location on the carrier, so that the elements are positioned along the tool string without vertical offset to one another. Thus, distinct detections of thermal and epithermal neutrons may be utilized at the same formation depth with equivalent rock geometries and neutron paths being evaluated, such that the first radiation responsive element and the second radiation responsive element detect neutrons at substantially the same depth along the wellbore. The formation being evaluated by each element is the same, leading to more consistent measurements between thermal and epithermal detectors, resulting in more accurate estimations. That is, the information more accurately represents the formation being evaluated.

Aspects of the present disclosure reduce or eliminate the need for shielding known in prior art for reducing neutron counts in a detector. Thus, utilization of scintillator components as described herein increases the efficiency of a dual detection system, facilitating the use of lower emitting and less environmentally impactful radiation sources. The ability to detect both thermal and epithermal neutrons at one location may allow for shortening the distance from a detector to a source, as well as reducing the total number of locations required and the power of the source configured to supply them with neutrons. Thus, a less powerful source may be utilized for measurement.

Figure 2A:
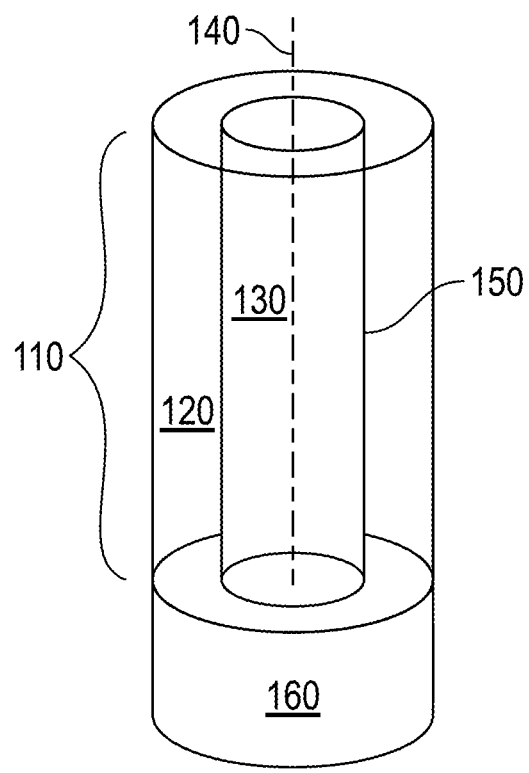
FIGS. 2A-2B show neutron detectors in accordance with embodiments of the present disclosure.

FIG. 2A illustrates a neutron detector 100 having a scintillator component 110 in accordance with embodiments of the invention. The scintillator component 110 includes a first radiation responsive element 120 and a second radiation responsive element 130. The scintillator component 110 further includes a light responsive device 160 (e.g., photomultiplier tube) optically coupled to the first radiation responsive element 120 and second radiation responsive element 130 at one end, such that light scintillations occurring in the elements are converted to electrical signals. The second radiation responsive element 130 is disposed within the first radiation responsive element 120, and thus placed within the space surrounded by the outer element 120. The first radiation responsive element 120 comprises a hollow cylinder circumscribing the second radiation responsive element. The hollow cylinder may have a wall thickness, in radial dimensions, selected to be greater than the mean free path of thermal neutrons and less than the mean free path of epithermal neutrons. The first radiation responsive element 120 may be concentric with the second radiation responsive element 130, and thus share the same central axis 140. The first radiation responsive element 120 may lie in contact with the second radiation responsive element 130 at a cylindrical interface 150 and may fill the cavity of the first radiation responsive element 120. As shown in FIG. 2A, the second radiation responsive element 120 is a solid cylinder, although in some embodiments, the second radiation responsive element could be hollow.

The shape of the first element 120 (e.g., a hollow cylinder) may be configured to reduce the gamma ray interactions in the crystal, thereby facilitating stripping of neutron counts from the resulting spectrum. The first radiation responsive element 120 may also result in reduced neutron count rates in comparison to a solid detector of identical diameter and length (e.g., 65-85 percent of the count rates that could be provided by solid detectors).

In other implementations, either element 120, 130 may be any tubular or hemispherical shape, having, for example, a generally ovular, rectangular, or irregular cross-section. In further embodiments, one or more of the elements may comprise an aggregate of a plurality of rods, sheets, beads, or other shapes comprised of one or more radiation responsive materials, a radiation responsive powdered material, and so on. In alternative embodiments, the radiation responsive elements are implemented as glass plates. The elements may be flat, or curved along one or more axes on one or more surfaces, or may be irregular.

The scintillation component may be configured to absorb neutrons incident thereon from a set of available paths (e.g., azimuthal paths, paths within a coordinate range, etc). The first element 120 may be configured to block these available paths of travel for neutrons from the formation to the second element 130. Additional paths of travel to the first or second element may be shielded using shielding material. Shielding material is defined as materials blocking transmission of neutrons without re-emitting such that the absorbed radiation is quantifiable, and may include barium, cadmium, and so on.

In one implementation, the first element 120 comprises a hollow cylinder of Li-6 glass. The dimensions of the cylinder wall may include a radial thickness around 2.5 mm ($\Delta R$, FIG. 2B). For a Li-6 glass with 6-7% Li-6 content, mean free path for thermal neutrons may be approximated at 0.5 mm. Thus, 2.5 mm thick glass is approximately five mean paths thick, and may stop about 96-100% of all incoming thermal neutrons. In contrast, neutrons with epithermal energy levels have mean free path values that are significantly longer than the configured thickness of the first element 120 due to the logarithmic nature of the variation of (n,t) reaction cross sections with incident neutron energy, as illustrated in FIG. 3A. Where the first element is implemented as a hollow cylinder, as in FIGS. 2A & 2B, the remaining thermal neutrons N (neutrons having traversed the first element) may be calculated from the initial number of incident neutrons $N_0$ according to radial thickness of the first element as $$N=N_0 e^{-\Sigma \Delta r} \tag{1}$$

Figure 4:
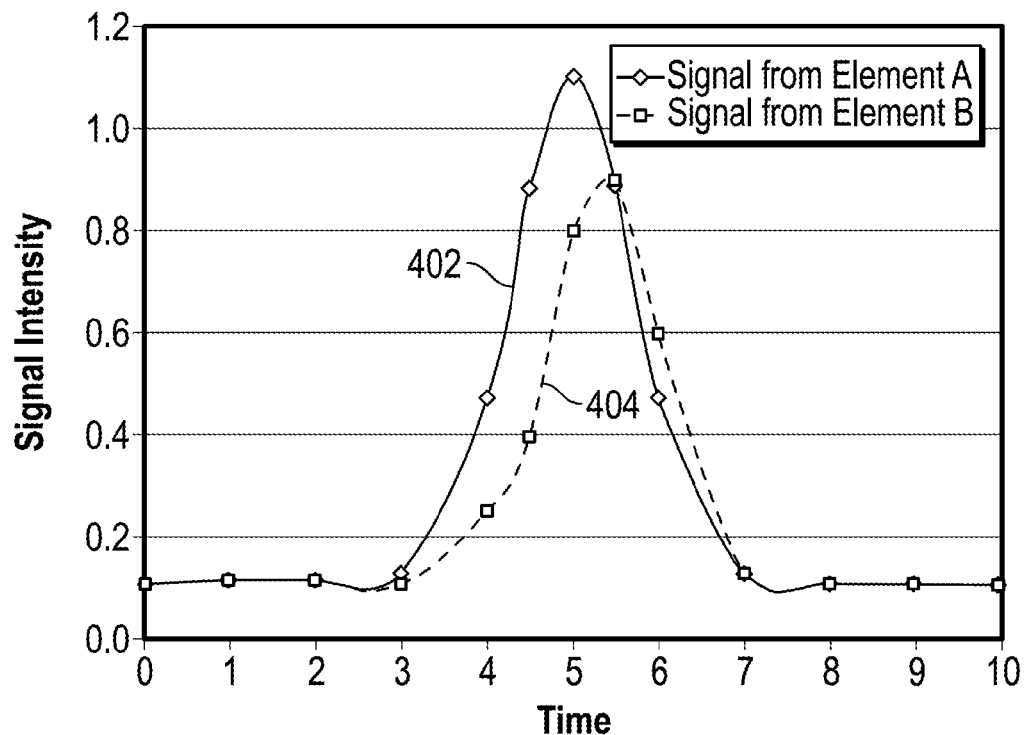
FIG. 4 shows a graphical illustration of the variation of the signal for individual radiation responsive elements.

Processing may be carried out on the output from the light responsive device 160 to determine the luminescent activity, and thus the number of neutrons incident, on each of the first element 120 and the second element 130. The scintillation component 110 may be configured such that the output of the at least one light responsive device 160 may include a parametric difference between the first light scintillations and the second light scintillations. The parametric differences may be differences in the shapes of light signal patterns with various intensities, such as the shape of a curve reflecting the variation of signal intensity over time. The first radiation responsive element 120 and the second radiation responsive element 130 may produce scintillations of different light intensities or different response curves. For example, the response curves of signal intensities over time may vary for each radiation responsive element, as shown in FIG. 4.

Figure 5:
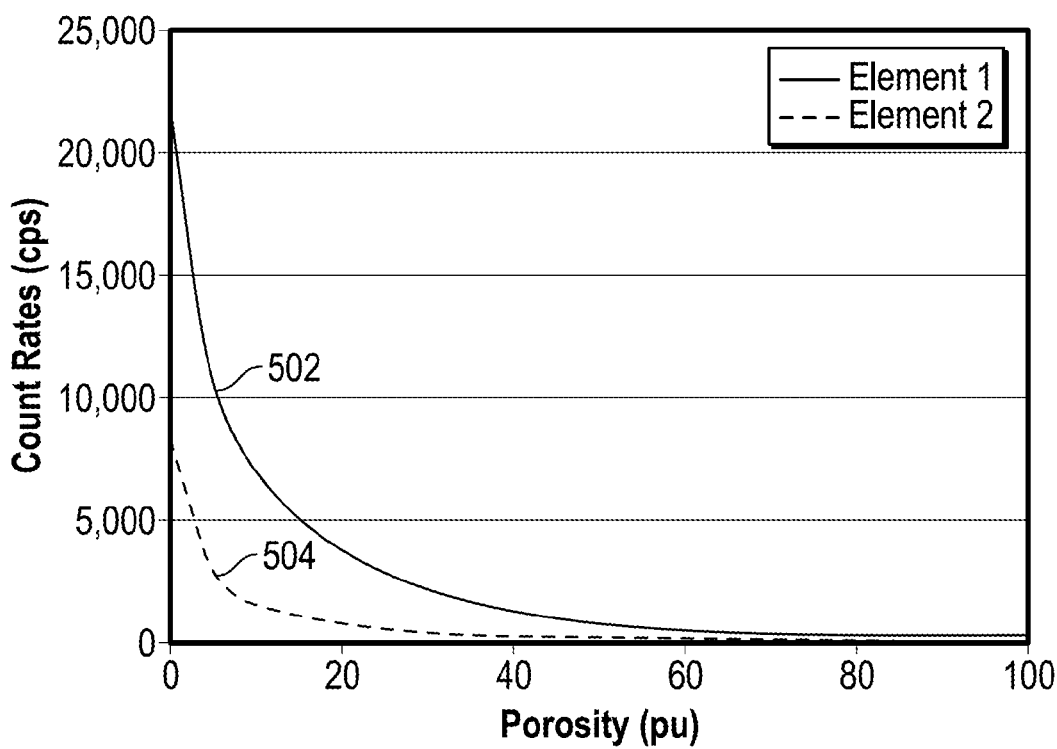
FIG. 5 shows a graphical illustration of a comparison of neutron count rates emanating from the first detector and the second detector in relation to the porosity in a zero salinity environment.

Variations in patterns may be used for analysis of "shapes" and "peaks" to attribute neutron counts to a specific radiation responsive element (e.g., the first radiation responsive element, the second radiation responsive element, etc.). The model graphically illustrated in FIG. 4 may be used in attributing scintillations to specific radiation types or to specific elements, or may be otherwise utilized in estimating at least one parameter of interest of the formation. Substantially all neutrons captured below the thermal energy boundary are captured by the first radiation responsive element 120. Thus scintillations corresponding to energies below the boundary (or another defined energy level) may be attributed to the first element 120. FIG. 5 illustrates a comparison of neutron count rates in a 0 kppm salinity environment emanating from the first detector 120 and the second detector 130 in relation to the porosity. Light intensity dampening or partially opaque materials may be placed between either (or both) radiation responsive material and a light responsive device to alter detected variations in light patterns and thus ultimately electrical signal patterns reflecting these variations.

Variations in patterns may also be used for analysis to determine what types of radiation are being detected, such as gamma rays, neutrons having different energy levels and the like. After discriminating for light pulses related to gamma rays using intensity and shape discrimination, the sum of the light scintillations in the first radiation element and the second radiation element are the same as the sum of the thermal neutron capture counts and the epithermal neutron capture counts.

The neutron detector 100 may be adapted to prevent attributing a scintillation to an element where the scintillation did not occur. The scintillator component 110 may be configured to substantially isolate the second radiation responsive element from first light scintillations and substantially isolate the first radiation responsive element from second light scintillations using a light isolation element. The light isolation element may be implemented as one of (i) an isolator, and (ii) a treatment applied to at least one of the first radiation responsive element and the second radiation responsive element. For example, at the interface 150 between the first element 120 and the second element 130, a treatment may be applied to the surface of one or both of the elements. A surface may be tinted, abraded, and/or coated to prevent the transmission of light pulses from one element to the other. The surface may also be manufactured with an irregular surface or other feature preventing the passage of light. Additionally and/or alternatively, the scintillator component may include an isolator that is transparent to epithermal neutrons (or neutrons generally) interposed between the first radiation responsive element and the second radiation responsive element. Further, hardware, firmware or software solutions may be employed to identify simultaneous dual detections of light flashes by light responsive devices related to specific particles or gamma rays and attribute the scintillation to the element where it actually occurred (i.e., the element in which the neutron was absorbed). For example, this may be carried out using one or more parameters of the simultaneously detected flashes, such as intensity, duration, and so on.

Figure 2B:
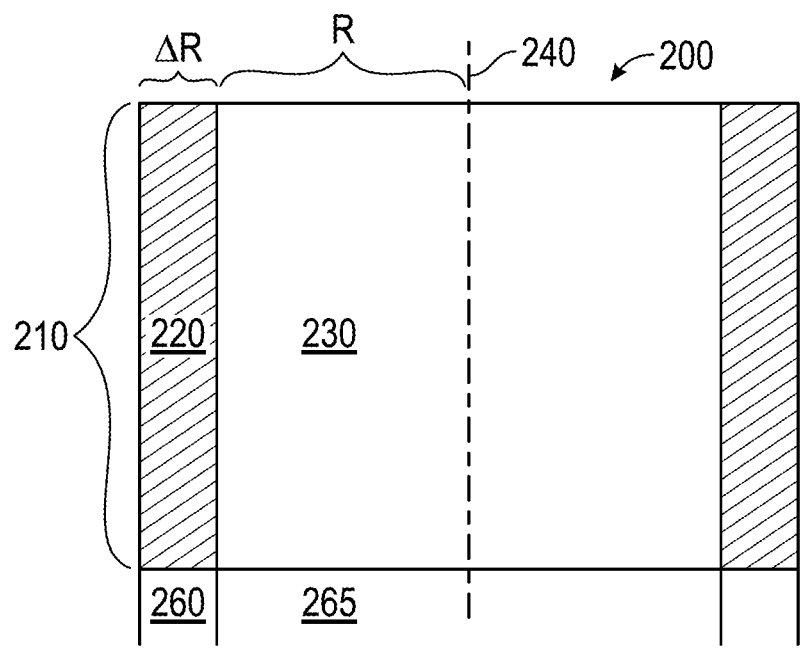

FIG. 2B illustrates a cross section of a neutron detector 200 in accordance with embodiments of the invention. The detector includes a scintillator component 210 having a first radiation responsive element 220 and a second radiation responsive element 230, as described above. A first light responsive device 260 is configured to produce an output in response to detection of the first light scintillations in the first element 220; and a second light responsive device 265 is configured to produce an output in response to detection of the second light scintillations in the second element 230. The two light responsive devices 260, 265 allow distinct detections of thermal and epithermal neutrons. Employing a dedicated light responsive device for each of the elements allows for more efficient detections of radiation. Hence, safer, less powerful radiation sources may be used while producing adequate radioactivity for valid measurements. However, detector 200 may have increased cost, size, and/or complexity from neutron detector 100. Processing methods as described above may also be used in conjunction with responses generated by multiple light responsive devices.

In some embodiments, more than two radiation responsive elements may be used. One or more of the radiation responsive elements may be coupled to a dedicated light responsive device, or any number of radiation responsive elements may share a single light responsive device.

Referring again to FIG. 1, in more specific embodiments, the tool 10 may be a 2¼" (5.72 cm) diameter wireline tool having a neutron detector as above configured to fit the tool. The length of the elements may be 8.35 cm. The outer diameter of the crystal may be 3.56 cm. The tool 10 may be adapted for a borehole having specific diameters, such as, for example, approximately 4 inches or 10 cm. In some aspects, the neutron detector 100 may be utilized in place of a traditional long space detector. The raw signal data and/or count rates for both detectors may be recorded and/or processed separately.

Figure 6:
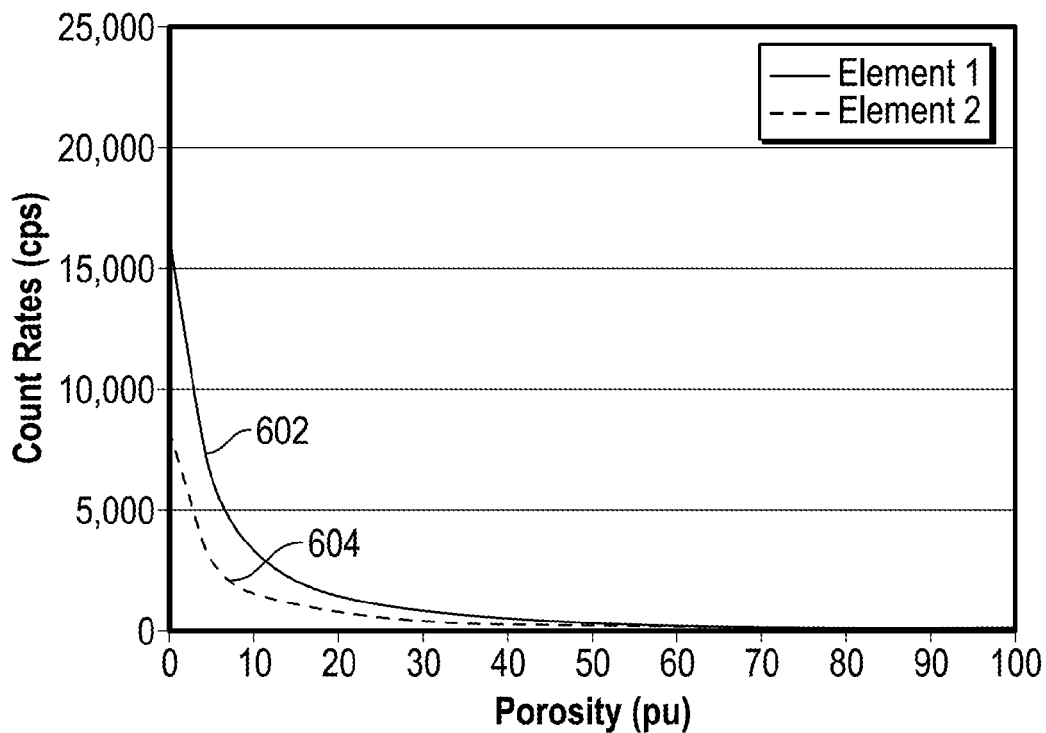
FIG. 6 shows a graphical illustration of a comparison of neutron count rates emanating from the first detector and the second detector in relation to the porosity in another salinity environment.
Figure 7:
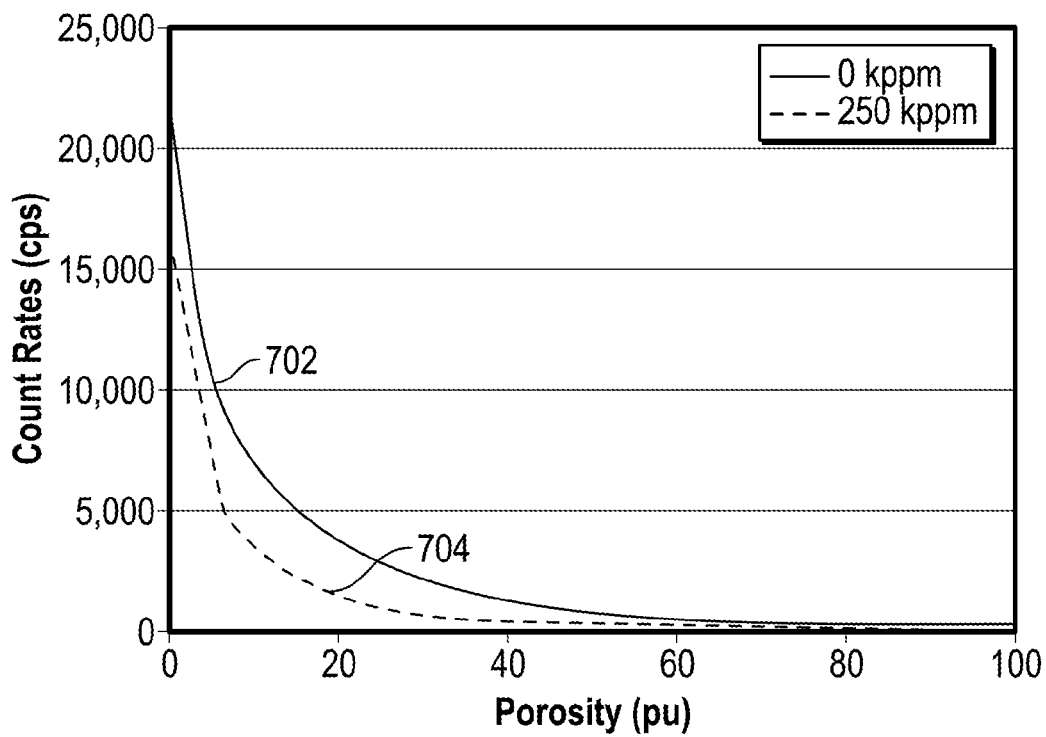
FIG. 7 shows a graphical illustration of the count rate variations between a 0 kppm salinity environment and a 250 kppm salinity environment for a first radiation responsive element.
Figure 8:
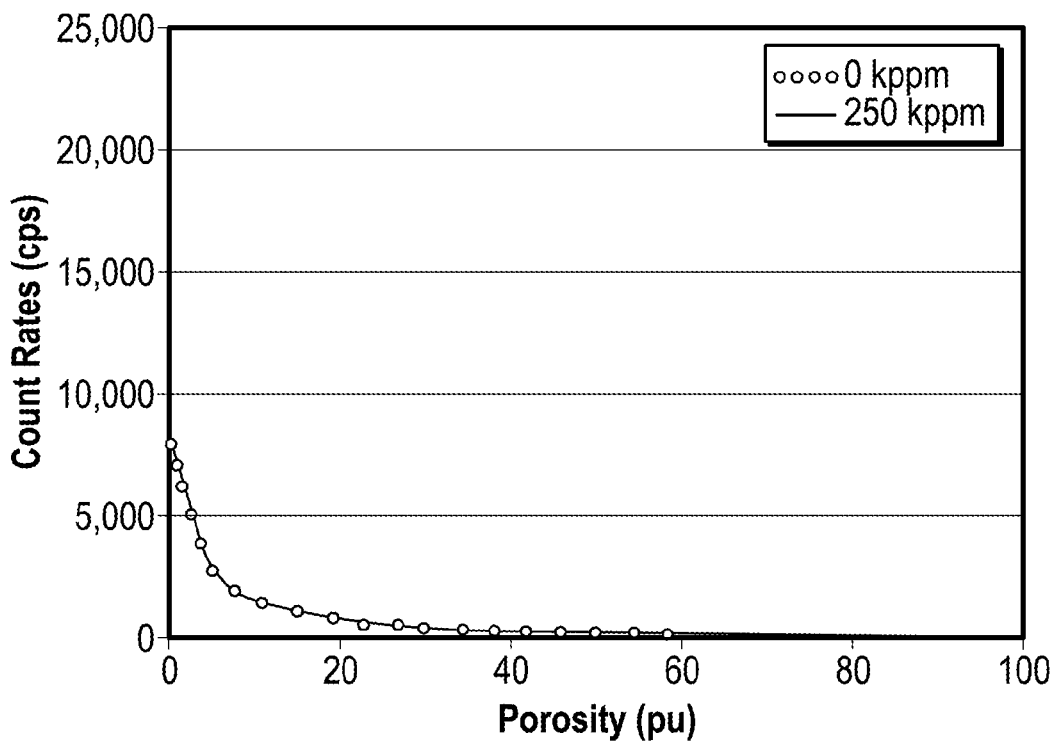
FIG. 8 shows a graphical illustration of the count rate variations between a 0 kppm salinity environment and a 250 kppm salinity environment for a second radiation responsive element.
Figure 9:
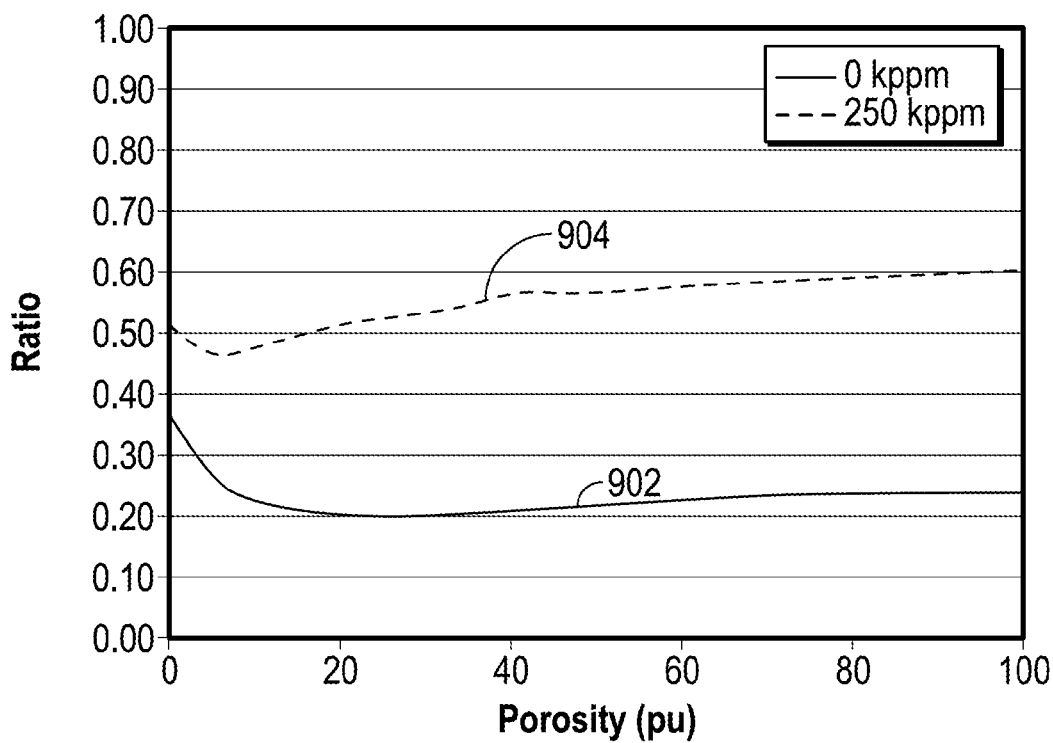
FIG. 9 shows a graphical illustration of a relation between a ratio of the second element to the first element and porosity for the 0 kppm salinity and 250 kppm salinity environments.

Processing of the responses attributable to neutron counts in the first element and the second element, respectively, allows for estimation of parameters of interest, such as, for example, porosity. FIGS. 5 and 6 illustrate neutron count rates from a first and second radiation responsive element of a neutron detector in accordance with embodiments of the present disclosure for a tool modeled in a 4" borehole in a limestone formation with porosity ranging from 0 to 100 pu and with, respectively, 0 and 250 kppm salinity environments. The neutron detector as modeled includes a hollow cylinder of Li-6 doped glass as the first radiation responsive element with a solid cylinder of Li-6 doped glass as the second radiation responsive element disposed therein. The solid cylinder substantially fills the cavity of the hollow cylinder. FIGS. 7 and 8 provide the count rate variations with porosity (pu) attributed to each detector individually. FIG. 7 illustrates the count rate variations between a 0 kppm salinity environment and a 250 kppm salinity environment for the first radiation responsive element. FIG. 8 illustrates the count rate variations between a 0 kppm salinity environment and a 250 kppm salinity environment for the second radiation responsive element. FIG. 9 shows a ratio of the second element to the first element in dependence upon porosity for the 0 kppm salinity and 250 kppm salinity environments.

Count rates attributable to the first element 120 (first element count rates) are significantly larger than rates attributable to the second element 130 (second element count rates). For example, first element count rates may be approximately four to five times larger in an approximately zero salinity environment, as illustrated in FIG. 9. FIG. 7 shows a steep reduction in the first element count rates, however, as salinity increases. In contrast, second element count rates stay substantially the same regardless of the salinity, as shown by FIG. 8. Thus, the difference between count rates decreases as salinity increases. At a salinity of about 250 kppm, second element count rates may be about 50-60% of the first element count rates.

The hollow crystal of the first element provides some advantages due to a reduction in the gamma ray interactions and count rates, but also results in reduced neutron count rates compared to a solid glass detector. The count rates available for such detectors are 65-85% of the count rates that are provided by solid detectors. This is one reason why source-to-detector spacing is shorter than comparable He-3 detector tools for LS sensors. By using the first and second element, simultaneously, the source-to-LS spacing may be increased while limiting gamma ray effects. Increasing the source-to-LS spacing may allow more scattering and more sensitivity to formation parameters. For example, source-to-LS spacing in a tool in accordance with embodiments of the disclosure may be approximately 2-3 feet in some implementations.

In further embodiments, the data from the neutron detector 100 may be used to simultaneously determine porosity of the earth formation and surrounding the apparatus and salinity of the fluid surrounding the apparatus. The count rates provided by the first element are apparently thermal neutron count rates. The count rates driven by higher energy count rates significantly smaller so as to be considered negligible. This can be inferred from the fact that count rates provided from the first element decrease significantly as salinity increases (FIG. 7). Increasing salinity typically reduces thermal neutrons in a system. If the first element were sensitive to the higher energy neutrons at a larger scale, the count rates would not decrease significantly. In contrast, the count rates provided by second element remain constant when salinity increases (FIG. 8). Since salinity would not have a large impact on the higher energy neutron flux, this is a clear indication that second element counts are mainly epithermal (fast) neutron counts.

Figure 10:
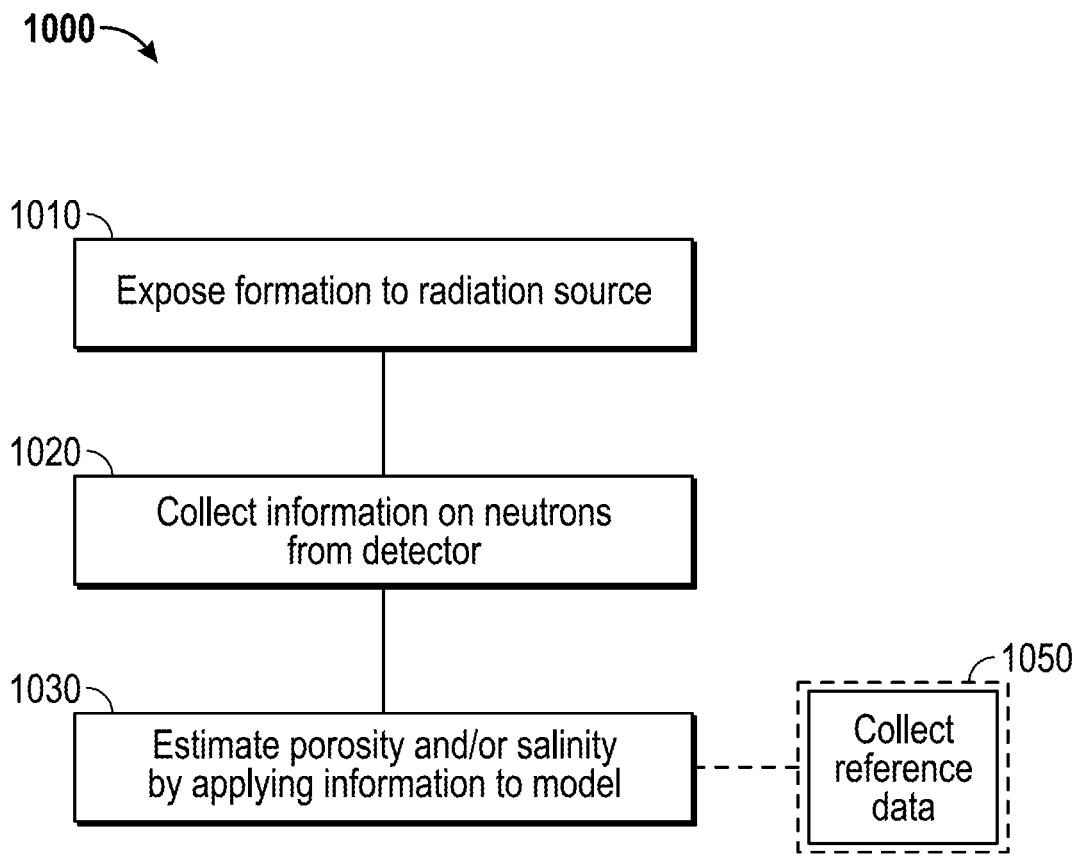
FIG. 10 shows, in flow chart form, one method in accordance with embodiments of the present disclosure for estimating at least one parameter of interest of the formation.

FIG. 10 shows, in flow chart form, one method 1000 according to the present disclosure for estimating at least one parameter of interest of the formation 80 (FIG. 1) using a model relating neutron count information acquired from at least neutron detector 100 (FIG. 2) to the parameter of interest (see FIGS. 5-9, relating neutron count information from elements of the detector to porosity and salinity). Referring now to FIGS. 1, 2 and 10, method 1000 may include step 1010, where the radiation source 40 emits neutrons in proximity to the formation 80. In step 1020, information on neutrons may be collected by one or more of detectors 20, 30, where at least one of the one or more detectors 20, 30 is a neutron detector 100, 200 collecting neutron count information from a first radiation responsive element 120, 220 and a second radiation responsive element 130, 230. In step 1030, porosity and/or salinity of the formation 80 may be estimated by applying one or more count rates from each of the first radiation responsive element and the second radiation responsive element from a detector to the model. Information collected by the detector(s) may be used to generate a difference between or a ratio of the neutron counts attributable to the first radiation responsive element 120, 220 and the second radiation responsive element 130, 230, respectively, as estimated by the detector(s) 100, 200. The estimation of the porosity and/or salinity may also include comparison or combination of the neutron count information with reference information about the formation. In some embodiments, estimation methods 1000 may include step 1050, where reference information on the formation or formations generally is accessed. Reference information may be combined with neutron count information in step 1030 to estimate porosity and/or salinity of the formation.

Shielding of the detectors may be implemented for neutrons and gamma rays. Gamma ray shielding prevents the detection of gamma rays from behind the tool and from that originating within the tool. Neutron shielding prevents neutrons from reaching the detector regions and inducing gamma rays. Combinations of neutron moderators, neutron absorbers, high hydrogen content epoxies, and high-density high-Z materials are known to those skilled in the art.

Herein, the term "information" may include, but is not limited to, one or more of: (i) raw data, (ii) processed data, and (iii) signals. The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions.

As used above, the term "absorb" refers to absorption in the sense of converting ionizing radiation to other detectable indicia, such as, for example, photons. As used above, the term "incident" or "incident on" refers to impinging on the physical space of or penetrating the defining boundaries of. As used above, the term "traverse" means to pass through without notable reaction.

Referring again to FIG. 1, certain embodiments of the present disclosure may be implemented with a hardware environment that includes an information processor 11, an information storage medium 13, an input device 17, processor memory 19, and may include peripheral information storage medium 9. The hardware environment may be in the well, at the rig, or at a remote location. Moreover, the several components of the hardware environment may be distributed among those locations. The input device 17 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 11 to execute the disclosed method. Information storage medium 13 may also store the formation information provided by the user, or the formation information may be stored in a peripheral information storage medium 9, which may be any standard computer information storage device, such as a USB drive, memory stick, hard disk, removable RAM, or other commonly used memory storage system known to one of ordinary skill in the art including Internet based storage. Information processor 11 may be any form of computer or mathematical processing hardware, including Internet based hardware.

When the program is loaded from information storage medium 13 into processor memory 19 (e.g. computer RAM), the program, when executed, causes information processor 11 to retrieve detector information from either information storage medium 13 or peripheral information storage medium 9 and process the information to estimate a parameter of interest. Information processor 11 may be located on the surface or downhole.

The present disclosure is susceptible to embodiments of different forms. While the present disclosure is discussed in the context of a hydrocarbon producing well, it should be understood that the present disclosure may be used in any borehole environment (e.g., a geothermal well). There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

We claim:

1. An apparatus for evaluating an earth formation intersected by a borehole, the apparatus comprising:
   a first radiation responsive element optically coupled to a first light responsive device and configured to absorb substantially all incident thermal neutrons and produce first light scintillations indicative of the absorbed thermal neutrons, the first light responsive device configured to produce an output in response to detection of the first light scintillations; and
   a second radiation responsive element optically coupled to a second light responsive device and configured to produce second light scintillations indicative of at least epithermal neutrons that traverse the first radiation responsive element, the second light responsive device configured to produce an output in response to detection of the second light scintillations;
   wherein the second radiation responsive element is disposed within the first radiation responsive element such that the first radiation responsive element and the second radiation responsive element detect neutrons at substantially the same depth along the wellbore;
   wherein the first radiation responsive element has a radial thickness selected to be sufficiently greater than the mean free path of thermal neutrons in the first radiation responsive element such that the first radiation responsive element absorbs substantially all incident thermal neutrons and produces first light scintillations indicative of the absorbed thermal neutrons while letting substantially all epithermal neutrons pass through; and
   wherein a count of the first light scintillations over a period of time following exposure of the earth formation to energy from a radiation source is at least 90 percent of a count of the thermal neutrons incident on the first radiation responsive element over the period of time.

2. The apparatus of claim 1, wherein the first and the second radiation responsive elements are formed at least partially of a material that produces light in response to incident neutrons.

3. The apparatus of claim 1, wherein the first and the second radiation responsive elements are formed at least partially of a doped glass.

4. The apparatus of claim 3, wherein the doped glass is doped with an isotope.

5. The apparatus of claim 4, wherein the doped glass includes an isotope of at least one of: (i) lithium, (ii) cerium, (iii) europium, (iv) praseodymium, and (v) terbium.

6. The apparatus of claim 1, wherein a count of the second light scintillations over the period of time is substantially the same as a count of conventionally detectable epithermal neutrons incident on the second radiation responsive element over the period of time.

7. The apparatus of claim 1, the apparatus further comprising a light isolation element to substantially isolate the second radiation responsive element from first light scintillations and isolate the first radiation responsive element from second light scintillations, the light isolation element comprising one of (i) an isolator, and (ii) a treatment applied to at least one of the first radiation responsive element and the second radiation responsive element.

8. The apparatus of claim 1, further comprising a processor configured to use an estimate of a first neutron count for the first radiation responsive element and an estimate of a second neutron count for the second radiation responsive element to estimate one of: (i) a porosity value of the earth formation, (ii) a shale content value of the earth formation, (iii) a salinity value of the earth formation, (iv) a geophysical property, (v) a petrophysical property, and (vi) a geological property.

9. The apparatus of claim 1, wherein the first radiation responsive element is substantially cylindrical.

10. The apparatus of claim 1, wherein the first radiation responsive element and the second radiation responsive element are substantially concentric.

11. A method of evaluating an earth formation intersected by a borehole, the method comprising:
absorbing, in a first radiation responsive element of an integrated detector optically coupled to a first light responsive device, substantially all incident thermal neutrons and thereby producing first light scintillations indicative of the absorbed thermal neutrons;
detecting the first light scintillations in the first light responsive device;
producing, in a second radiation responsive element of the integrated detector, light scintillations indicative of at least epithermal neutrons that traverse a first radiation responsive element of an integrated detector; and
detecting the second light scintillations in the second light responsive device;
wherein the first radiation responsive element has a radial thickness selected to be sufficiently greater than the mean free path of thermal neutrons in the first radiation responsive element such that the first radiation responsive element absorbs substantially all incident thermal neutrons and produces first light scintillations indicative of the absorbed thermal neutrons while letting substantially all epithermal neutrons pass through; and
wherein a count of the first light scintillations over a period of time following exposure of the earth formation to energy from a radiation source is at least 90 percent of a count of the thermal neutrons incident on the first radiation responsive element over the period of time.

\* \* \* \* \*